United States Patent
Healy et al.

(10) Patent No.: US 11,119,766 B2
(45) Date of Patent: Sep. 14, 2021

(54) HARDWARE ACCELERATOR WITH LOCALLY STORED MACROS

(71) Applicant: INTERNATIONAL BUSINESS MACHINES CORPORATION, Armonk, NY (US)

(72) Inventors: Michael J. Healy, Concord, MA (US); Jason A. Viehland, Sudbury, MA (US); Jeffrey H. Derby, Chapel Hill, NC (US); Diana L. Orf, Natick, MA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 92 days.

(21) Appl. No.: 16/211,820

(22) Filed: Dec. 6, 2018

(65) Prior Publication Data

US 2020/0183686 A1 Jun. 11, 2020

(51) Int. Cl.
*G06F 9/30* (2018.01)
*G06F 13/16* (2006.01)
*G06F 13/28* (2006.01)

(52) U.S. Cl.
CPC ........ *G06F 9/3004* (2013.01); *G06F 9/30036* (2013.01); *G06F 9/30101* (2013.01); *G06F 13/1668* (2013.01); *G06F 13/28* (2013.01); *G06F 2213/28* (2013.01)

(58) Field of Classification Search
None
See application file for complete search history.

(56) References Cited

U.S. PATENT DOCUMENTS

| 7,360,063 | B2 | 4/2008 | Capek et al. |
| 7,631,167 | B2 | 12/2009 | Capek et al. |
| 8,244,718 | B2 | 8/2012 | Chamdani et al. |
| 8,754,893 | B2 | 6/2014 | Lippincott et al. |
| 9,021,426 | B2 | 4/2015 | Crowell et al. |

(Continued)

FOREIGN PATENT DOCUMENTS

| CN | 102135951 | 7/2011 |
| KR | 20170114618 | 10/2017 |

OTHER PUBLICATIONS

English machine translation of CN102135951 dated Dec. 4, 2018, pp. 17.

(Continued)

*Primary Examiner* — John M Lindlof
(74) *Attorney, Agent, or Firm* — Konrad Raynes Davda & Victor LLP; Janaki K. Davda

(57) ABSTRACT

Provided are techniques for a hardware accelerator with locally stored macros. A plurality of macros are stored in a lookup memory of a hardware accelerator. In response to receiving an operation code, the operation code is mapped to one or more macros of the plurality of macros, wherein each of the one or more macros includes micro-instructions. Each of the micro-instructions of the one or more macros is routed to a function block of a plurality of function blocks. Each of the micro-instructions is processed with the plurality of function blocks. Data from the processing of each of the micro-instructions is stored in an accelerator memory of the hardware accelerator. The data is moved from the accelerator memory to a host memory.

12 Claims, 8 Drawing Sheets

(56) References Cited

U.S. PATENT DOCUMENTS

| | | |
|---|---|---|
| 9,811,287 B2 | 11/2017 | Derby et al. |
| 9,817,612 B2 | 11/2017 | Derby et al. |
| 2012/0260062 A1 | 10/2012 | Derby et al. |
| 2013/0024661 A1* | 1/2013 | Abdallah ............... G06F 9/3842 712/205 |
| 2013/0145128 A1* | 6/2013 | Schardt .................... G06F 9/24 712/215 |
| 2017/0068540 A1 | 3/2017 | Abdallah |
| 2017/0161067 A1* | 6/2017 | Henry ................... G06F 3/0673 |

OTHER PUBLICATIONS

English machine translation of KR20170114618 dated Dec. 4, 2018, pp. 6.
A. Vega, et al., "Architectural perspectives of future wireless base stations based on the IBM PowerEN™ processor". High Performance Computer Architecture (HPCA), 2012 IEEE 18th International Symposium on, pp. 1-10.
J.H. Derby, et al,. "VICTORIA—VMX Indirect Compute Technology Oriented Towards In-Line Acceleration", CF'06, May 3-5, 2006, Ischia, Italy. ACM 1-59593-302—Jun. 6, 0005, Total pp. 9.
"64-Bit ELF V2-ABI Specification", OpenPOWER, Power Architecture Workgroup Specification Revision 1.4, May 10, 2017, Total pp. 236.
M. Michael, et al., Scalable Lock-Free Dynamic Memory Allocation, ACM, PLDI'04, Jun. 9-11, 2004, Washington, DC, Total pp. 12.
"Power ISA™ Version 2.07", IBM Corporation, May 3, 2013, Book I, A, pp. Cover Page/i-xxx/1-85, Total pp. 115.
"Power ISA™ Version 2.07", IBM Corporation, May 3, 2013, Book I, B, pp. 86-200, Total pp. 115.
"Power ISA™ Version 2.07", IBM Corporation, May 3, 2013, Book I, C, pp. 201-315, Total pp. 115.
"Power ISA™ Version 2.07", IBM Corporation, May 3, 2013, Book I, D, pp. 316-430, Total pp. 115.
"Power ISA™ Version 2.07", IBM Corporation, May 3, 2013, Book I, E, pp. 431-545, Total pp. 115.
"Power ISA™ Version 2.07", IBM Corporation, May 3, 2013, Book I, F, pp. 546-660, Total pp. 115.
"Power ISA™ Version 2.07", IBM Corporation, May 3, 2013, Book I, G, pp. 661-732, Total pp. 72.
"Power ISA™ Version 2.07", IBM Corporation, May 3, 2013, Book II, A, pp. 733-832, Total pp. 100.
"Power ISA™ Version 2.07", IBM Corporation, May 3, 2013, Book II, B, pp. 833-932, Total pp. 100.
"Power ISA™ Version 2.07", IBM Corporation, May 3, 2013, Book II, C, pp. 933-1032, Total pp. 100.
"Power ISA™ Version 2.07", IBM Corporation, May 3, 2013, Book II, D, pp. 1033-1107, Total pp. 75.
"Power ISA™ Version 2.07", IBM Corporation, May 3, 2013, Book II, E, pp. 1108-1182, Total pp. 75.
"Power ISA™ Version 2.07", IBM Corporation, May 3, 2013, Book II, F, pp. 1183-1301, Total pp. 119.
"Power ISA™ Version 2.07", IBM Corporation, May 3, 2013, Book II, G, pp. 1302-1406, Total pp. 105.
"Power ISA™ Version 2.07", IBM Corporation, May 3, 2013, Book II, H, pp. 1407-1496, Total pp. 90.
G., Genest et al., "Programming an FPGA-based super computer using a C-to-VHDL compiler: DIME-C", IEEE 2007, Second NASA/ESA Conference on Adaptive Hardware and Systems (AHS 2007), pp. 7.

* cited by examiner

400

| | |
|---|---|
| 1. addi | 37. vmuleuw |
| 2. addis | 38. vmuloub |
| 3. bdnz | 39. vmulouw |
| 4. blr | 40. vnand |
| 5. blt | 41. vnor |
| 6. cmp | 42. vor |
| 7. cmpi | 43. vpackeh |
| 8. incrmrh | 44. vpackew |
| 9. incrmrhm | 45. vpackoh |
| 10. initmr | 46. vpackow |
| 11. lvblk64 | 47. vsld |
| 12. mfmr | 48. vsldoi |
| 13. mfwsrd | 49. vslh |
| 14. mraddh | 50. vslw |
| 15. mtctcr | 51. vspackw |
| 16. mtmr | 52. vspltd |
| 17. mtvsrd | 53. vsplth |
| 18. setmr | 54. vspltish |
| 19. setmre | 55. vspltisw |
| 20. srawi | 56. vspltw |
| 21. stvblk64 | 57. vsrd |
| 22. vaddudm | 58. vsrh |
| 23. vadduhm | 59. vsrw |
| 24. vadduwm | 60. vsubudm |
| 25. vand | 61. vsubuhm |
| 26. vcmpequw | 62. vsubuwm |
| 27. vcmpequw | 63. vxcmpcntd |
| 28. vcmpgtuh* | 64. vxcmpcnth |
| 29. venqueue | 65. vxcmpcntw |
| 30. vegtpw | 66. vxcmpeqd |
| 31. vmrghb | 67. vxcmpeqh |
| 32. vmrghh | 68. vxcmpeqw |
| 33. vmrghw | 69. vxcmpseqd |
| 34. vmrglb | 70. vxcmpseqh |
| 35. vmrglh | 71. vxcmpseqw |
| 36. vmrglw | 72. vxor |

FIG. 4

HARDWARE ACCELERATOR WITH LOCALLY STORED MACROS

BACKGROUND

1. Field of the Invention

Embodiments of the invention relate to a hardware accelerator with locally stored macros.

2. Description of the Related Art

A hardware accelerator may be described as computer hardware that performs some functions more efficiently than instructions (software or code) running on a Central Processing Unit (CPU). The instructions are stored in host memory coupled to the CPU and are sent across a bus to the hardware accelerator. In some cases, the same instructions are sent from the host memory across the bus to the hardware accelerator many times. This leads to repetitive movement of instructions across the bus.

SUMMARY

In accordance with embodiments, a computer-implemented method is provided for a hardware accelerator with locally stored macros. The computer-implemented method comprises operations. A plurality of macros are stored in a lookup memory of a hardware accelerator. In response to receiving an operation code, the operation code is mapped to one or more macros of the plurality of macros, wherein each of the one or more macros includes micro-instructions. Each of the micro-instructions of the one or more macros is routed to a function block of a plurality of function blocks. Each of the micro-instructions is processed with the plurality of function blocks. Data from the processing of each of the micro-instructions is stored in an accelerator memory of the hardware accelerator. The data is moved from the accelerator memory to a host memory.

In yet other embodiments, a computer system is provided for a hardware accelerator with locally stored macros. The computer system comprises: a processor coupled to a bus; a host memory coupled to the bus; and a hardware accelerator coupled to the bus. The hardware accelerator comprises an engine, and the engine comprises: an instruction queue that stores a plurality of operation codes; a packetizer that stores a plurality of macros in a lookup memory, wherein the packetizer maps an operation code of the plurality of operation codes to one or more macros of the plurality of macros, and wherein each of the one or more macros includes micro-instructions; a dispatcher that routes each of the micro-instructions of the one or more macros to a function block of a plurality of function blocks that is to process that micro-instruction; an accelerator memory that stores data from processing of each of the micro-instructions by the plurality of function blocks; and a direct memory access that moves the data from the accelerator memory to a host memory.

In further embodiments, a hardware accelerator in a computer system is provided for locally stored macros. The computer system also includes a processor and a host memory. The hardware accelerator comprises: plurality of engines, wherein each engine includes: an instruction queue; a packetizer; a dispatcher; an accelerator memory; a plurality of function blocks; a direct memory access; and control logic to perform operations, the operations comprising: storing, with the instruction queue, a plurality of operation codes; storing, with the packetizer, a plurality of macros in a lookup memory; mapping, with the packetizer, an operation code of the plurality of operation codes to one or more macros of the plurality of macros, wherein each of the one or more macros includes micro-instructions; routing, with the dispatcher, each of the micro-instructions of the one or more macros to a function block of a plurality of function blocks that is to process that micro-instruction; processing, with the plurality of function blocks, each of the micro-instructions to generate and store data in the accelerator memory; and moving, with the direct memory access, the data from the accelerator memory to the host memory.

BRIEF DESCRIPTION OF THE SEVERAL VIEWS OF THE DRAWINGS

Referring now to the drawings in which like reference numbers represent corresponding parts throughout:

FIG. 4 illustrates a list of operation codes in accordance with certain embodiments.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
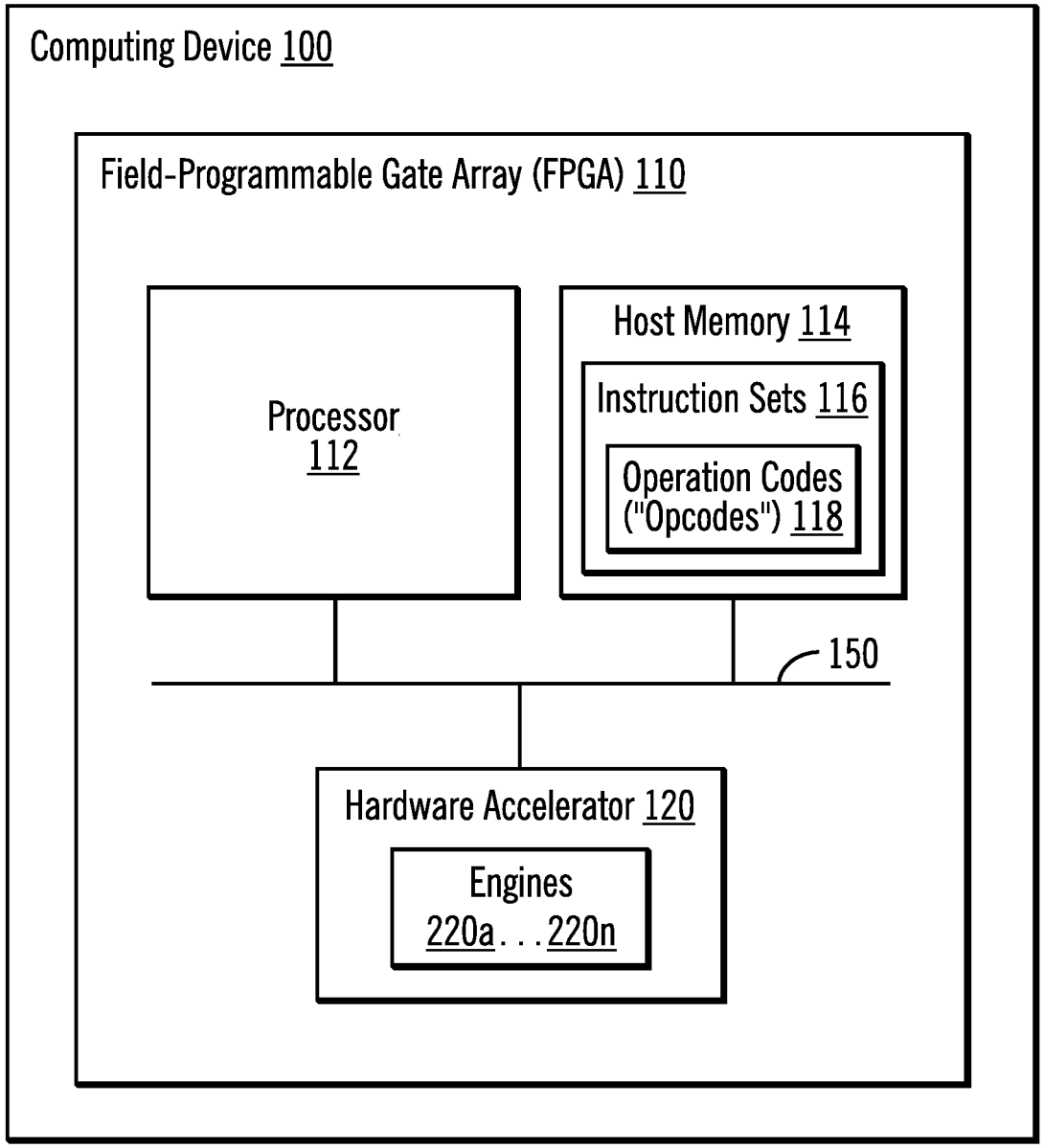
FIG. 1 illustrates, in a block diagram, a computing environment in accordance with certain embodiments.

FIG. 1 illustrates, in a block diagram, a computing environment in accordance with certain embodiments. The computing device 100 may be a cell phone, a desktop computer, a server computer, etc.

The computing device 100 includes a Field-Programmable Gate Array (FPGA) 110. The FPGA 110 may be described as an integrated circuit that may be configured. The FPGA 110 includes a processor 112 (e.g., a Central Processing Unit (CPU)), a host memory 114, and a hardware accelerator 120. The software-side components are the processor 112 and the host memory 114, while the hardware-side component is the hardware accelerator 120. Bus 150 connects the processor 112, the host memory 114, and the hardware accelerator 120. In particular, the host memory 114 may be said to be connected through the processor 112, and the processor 112 initiates movement of data across the bus 150.

Although an FPGA is illustrated, in other embodiments, the computing device 100 includes an Application-Specific Integrated Circuit (ASIC) with the engines.

In certain embodiments, the host memory 114 is Random-Access Memory (RAM). The host memory 114 stores instruction sets 116 with operation codes ("opcodes") 118. In certain embodiments, the instruction sets 116 may be described as algorithms. In certain embodiments, the bus 150 is a Peripheral Component Interconnect Express (PCI Express or PCIe) bus. In other embodiments, the bus 150 is a coherent accelerator attachment, network connection or other high-speed data bus. The operation codes 118 of the instruction sets 116 map to macros that are stored in the hardware accelerator 120.

The hardware accelerator 120 includes engines 200a . . . 200n. Including multiple instances of the engines 200a . . . 200n in the FPGA 110 allows task-level parallelism for different, software-programmable workloads.

An operation code ("opcode") may be described as a portion of a machine language instruction (in the instruction sets) that specifies an operation to be performed. Beside the operation code itself, the machine language instruction may also specify the data to be processed in the form of operands. In certain embodiments, the hardware accelerator 120 moves the operation codes 118 from the host memory 114 (software-side) to the hardware accelerator 120 (hardware-side). In certain embodiments, the operation codes are 32 bit operation codes. Unlike conventional systems that repeatedly send the instruction sets 116 across the bus 150 between the host memory 114 and the hardware accelerator 120, the hardware accelerator 120 stores macros that map to the operation codes of the instruction sets. Such storage of macros avoids the inefficiency of repetitive moving of the instruction sets across the bus 150.

Figure 2:
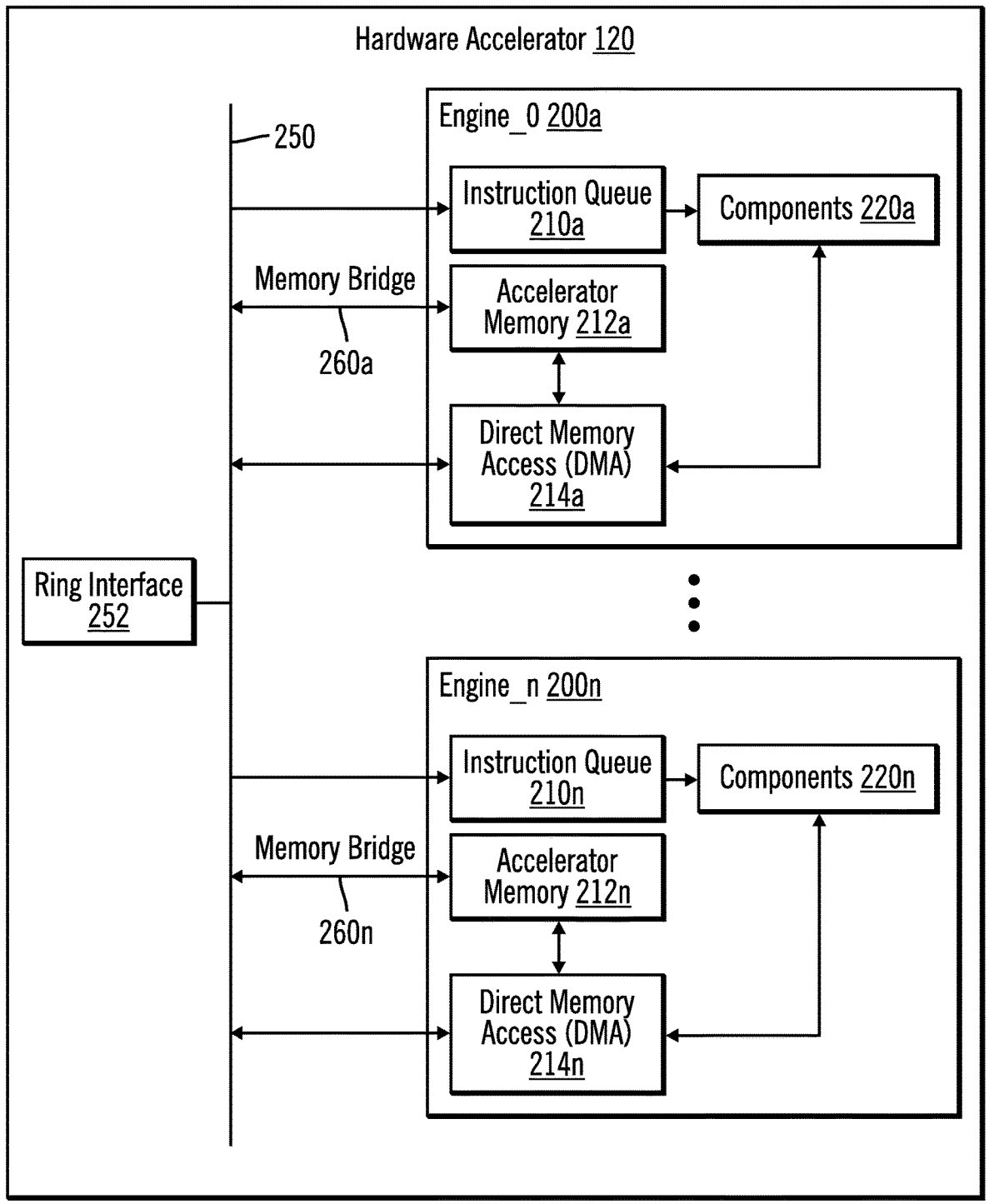
FIG. 2 illustrates further details of a hardware accelerator in accordance with certain embodiments.

FIG. 2 illustrates further details of a hardware accelerator 120 in accordance with certain embodiments. In FIG. 2, the hardware accelerator 120 includes engines 200a . . . 200n. The engines 200a . . . 200n are coupled to a bus 250 (e.g., a Peripheral Component Interconnect Express (PCI Express) bus, a coherent accelerator attachment, network connection, or other high-speed data bus). The bus 250 may include a ring interface 252. With embodiments, bus 150 is a bus of a host system that is external to the hardware accelerator 120, and bus 250 is an internal bus of the hardware accelerator 120. The bus 250 decodes the data from the bus 150 and presents that decoded data for the engines 220a . . . 220n to access via the ring interface 252.

As an example, engine 200a includes an instruction queue 210a coupled to components 220, an accelerator memory 212a, and Direct Memory Access (DMA) 214a. The DMA 214a may be referred to as DMA logic. Each of the engines 200a . . . 200n includes the components described with reference to engine 200a. In certain embodiments, each DMA 214a . . . 214n is coupled to the bus 250. In alternative embodiments, each DMA 214a . . . 214n of each of the engines 200a . . . 200n is coupled to a separate bus (other than bus 250) for efficient communication between each DMA 214a . . . 214n. Also, the accelerator memory 212a . . . 212n connects each engine 200a . . . 200n to a memory bridge 260a . . . 260n.

The hardware accelerator 120 offers a parallel implementation with the engines 200a . . . 200n and provides task and data parallelism design (e.g., for analytics workloads using vectorized data, including in-memory database structures, machine learning data sets, unstructured data that may be represented as data vectors, etc.).

Figure 3:
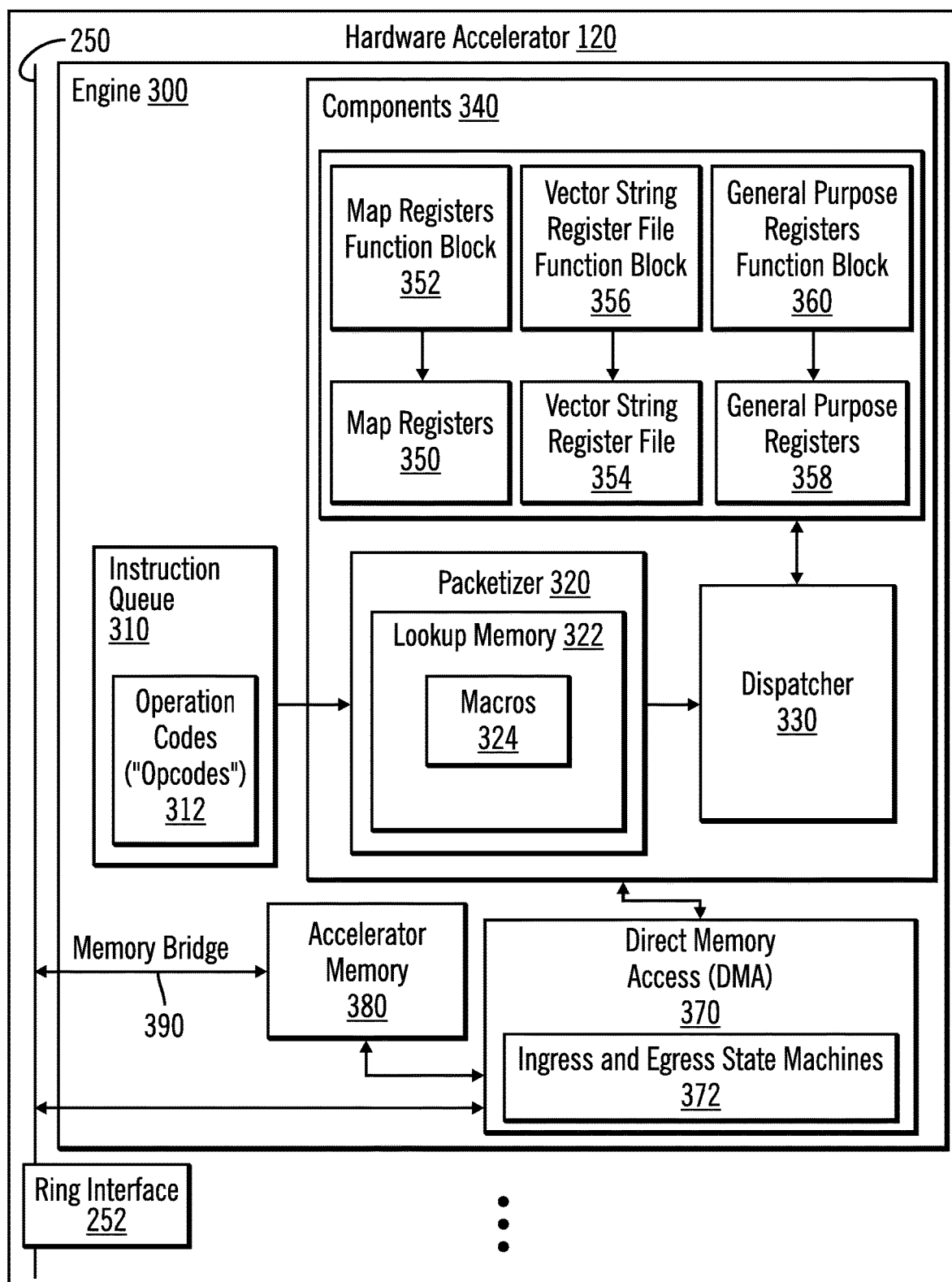
FIG. 3 illustrates further details of an engine in accordance with certain embodiments.

FIG. 3 illustrates further details of an engine 300 in accordance with certain embodiments. Each of the engines 200a . . . 200n includes the elements of engine 300 shown in FIG. 3.

The engine 300 includes an instruction queue 310, components 340, a DMA 370, an accelerator memory 380, and a memory bridge 390.

The components 340 include a packetizer 320, a dispatcher 330, map registers (MR) 350, a MR function block 352, a Vector String Register File (VSRF) 354, a VSRF function block 356, General Purpose registers (GPR) 358, and a GPR function block 360. The packetizer 320 stores a lookup memory 322 (e.g., RAM), which stores macros 324. Additionally, the accelerator memory 380 connects the engine 300 to a memory bridge 390, which is coupled to bus 250 and to the ring interface 252. The macros 324 may be described as instruction sets. The ellipses indicate that the hardware accelerator 120 includes other engines.

In certain embodiments, memory access of the accelerator memory 380 may be transactional and out of order. The engine 300 may have its own multi-channel DMA 370 capable of loading multiple data sources to the accelerator memory 380 or to the host memory 114. The DMA 370 includes ingress and egress state machines 372.

The DMA 370 independently manages data movement. In certain embodiments, the ring interface 252 of the bus 250 arbitrates this in a fair round-robin access manner to ensure every engine 220a . . . 220n has equal opportunities to request data from the host memory 114.

The DMA 370 is responsible for reading operation codes 312 into the instruction queue 310, moving data into the accelerator memory 380 for later processing, and moving results from the accelerator memory 380 back to the host memory 114 for the processor 112.

Software applications (that execute on the processor 112) have the ability to queue up to 32 Input Buffer Descriptors (IBD) and Output Buffer Descriptors (OBD) and have the ability to read the buffer descriptor First In First Out (FIFO) depths for each descriptor. These descriptors allow the hardware accelerator 120 to fetch data from the host memory 114. These descriptors indicate where the data to be loaded is, the type of data, and how much data there is. With embodiments, program data (operation codes 312) are loaded into the instruction queue, while application data, which is data used by instructions (e.g., micro-instructions of macros 324 mapped to operation codes 312), is described by the descriptors.

The DMA 370 processes one descriptor at a time and in the order in which the descriptor is delivered, but has ingress and egress state machines 372 to processes both IBDs and OBDs simultaneously.

The ingress DMA state machine processes the IBDs from an operation queue. The ingress DMA state machine does not have to stall the processing of back to back IBDs directed to the accelerator memory.

The engine 300 has a single instruction queue 310 and instruction IBDs are loaded directly into this instruction queue. Therefore, the ingress DMA state machine may stall the processing of instruction IBDs if the engine 300 is currently executing other instructions. In this case, the ingress DMA state machine looks at the next IBD in the operational queue to process.

The egress DMA state machine may process back to back OBDs without having to stall, assuming the output data is available to be moved.

After the data for that descriptor has been requested and is received, the Buffer Descriptor is considered consumed and removed from the instruction queue 310.

Once the descriptors have been processed, the DMA sends status to respective input and output circular status queues. In certain embodiments, the engine 300 contains 4 kB (kilobyte) status queues which hold 32 entries, each 32 Double Word (DW) long. Each status is 128 bytes and may contain processing metrics, errors, or other useful information. The multiple entries allow the hardware accelerator 120 to continue working independent of receiving acknowledgement that previous work has been completed.

The instruction queue 310 receives an ordered list of operation codes 312 and holds them in an array until they are processed by the packetizer 320. The packetizer 320 is the master control for the engine 300 data path, and the function blocks 352, 356, 360 are synchronized to the packetizer 320.

The packetizer 320 decodes each operation code 312 using the lookup memory 322 and enforces strict in-order execution of the operation codes 312. New operation codes 312 may be added without releasing a new FPGA bit image by reprogramming the lookup memory 322 for each operation code 312.

The packetizer 320 provides read/write controls into the instruction queue 310, receives each 32-bit read data entry, and reformats that to an internal format, which the packetizer 320 forwards to the dispatcher 330, along with a unique 5-bit tag. Thus, with embodiments the packetizer 320 pulls 32 bit operation codes 312 from the instruction queue 310.

Each single operation code 312 from the instruction queue 310 is formatted by a lookup to create a parallel processing output. This is a 210 bit Master-Instruction to the function blocks 352, 356, 360, with micro-instructions that give each function block 352, 356, 360 instructions on what to do with its incoming data. In certain embodiments, the micro-instructions are advantageously processed in parallel by the function blocks 352, 356, 360 for improved efficiency.

The dispatcher 330 receives the inputs from the packetizer 320 and routes relevant fields to applicable downstream function blocks 352, 356, 360.

The map registers 350 contain pointers to the data in the VSRF 354. In certain embodiments, there are 32 map registers, each containing 8, 16-bit entries for a total of 256 entries.

The operation codes 312 address map registers with 5 bits. Depending on the operation code type, the map registers may be accessed via one of the following two types of indirection: generalized indirection or operand-associated indirection.

In generalized indirection, the operation code 312 input is a 5-bit addresses. This address points to one of the 32 map registers. All 32 map registers may be accessed via generalized indirection. This technique is typically used when reading out the entire 128-bits.

In operand-associated indirection, the operation code 312 input is a 5-bit address and a "map" indicator (where the Map is T, A, B or C). The combination of the map indicator and the 5-bit address points to one 16-bit entry within a "map" of entries. The first 16 map registers may be accessed via operand-associated indirection. This technique is used in the majority of the operation codes 312.

In certain embodiments, the VSRF 354 is a 64 kB (kilobyte) register array organized as a 32B (byte) wide× 2048 entry deep Block RAM (BRAM). The VSRF 354 is used as a register file to store computations during instruction set processing or data being staged via load/store or group load/store operations for processing. Read and write operations to the VSRF 354 are also executed.

Used in conjunction with the map registers 350, the VSRF 354 may be configured into FIFOs, used as an instruction cache or data pipelining.

In certain embodiments, there are 64b (bit) GPRs 358.

The memory bridge 390 presents a flat memory space to the engine 300. The memory bridge 390 supports access from the engine 300 to the host memory 114.

FIG. 4 illustrates a list of operation codes 400 in accordance with certain embodiments. The operation codes 400 may be described as identifiers for the macros. Each of the operation codes 400 may map to one or more macros. For example, an operation code for a special type of looped multiply accumulate may map to one or more macros, which describe the micro-instructions that are sent to each function block based on that single operation code. These micro-instructions go to each function block indicating what that function block needs to do at every cycle.

In certain embodiments, some of the operation codes may map to more extensive macros. With embodiments, new macros may be stored, already stored macros may be updated (e.g., modified), and macros may be removed. Thus, the macros may be optimized or improved as hardware is modified. For example, the macros may be optimized or improved based on performance analysis to make them better. Also, new macros may be added as additional logic, function blocks or operations to the function blocks are added.

Figure 5A:
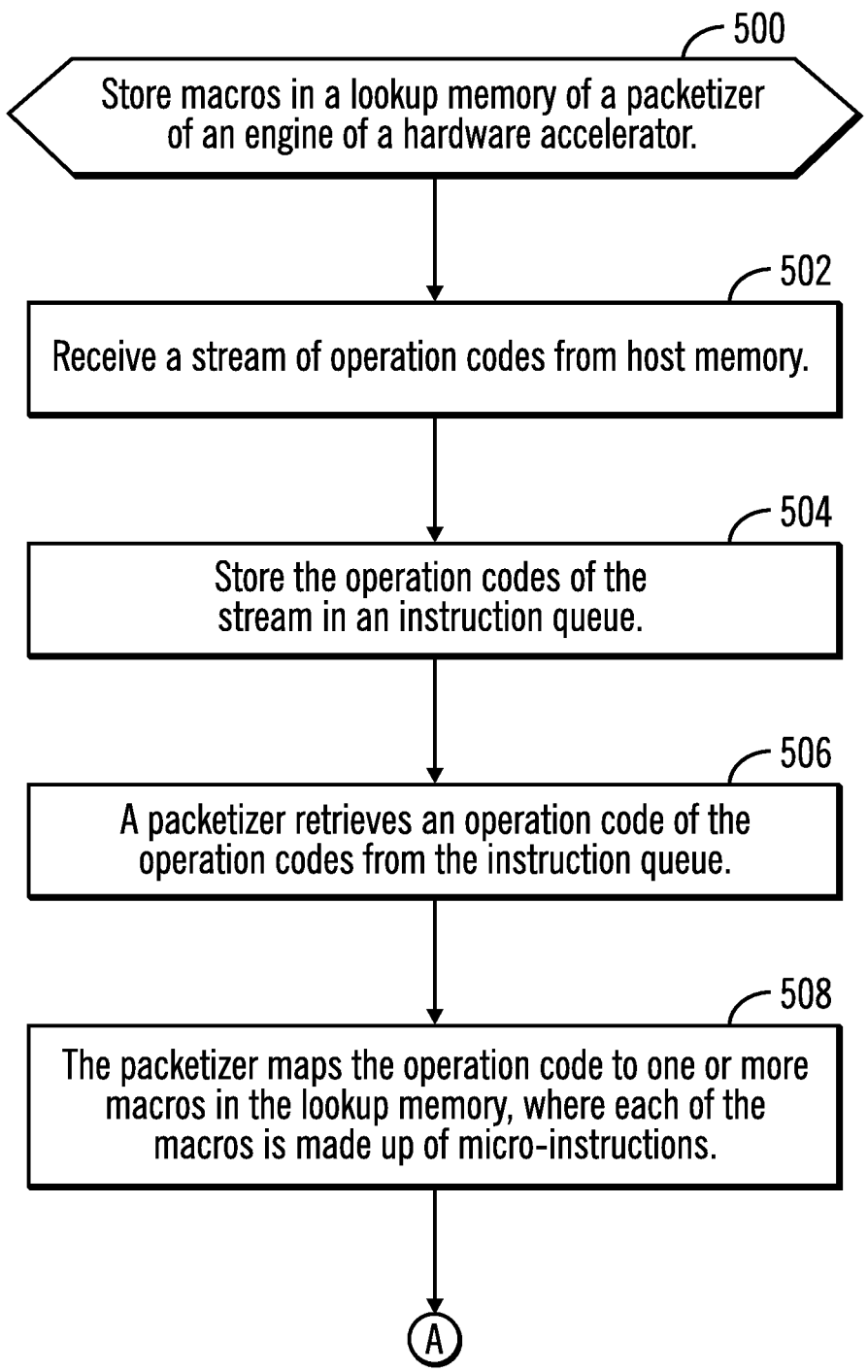
FIGS. 5A and 5B illustrates, in a flowchart, operations performed by an engine to process an operation code in accordance with certain embodiments.
Figure 5B:
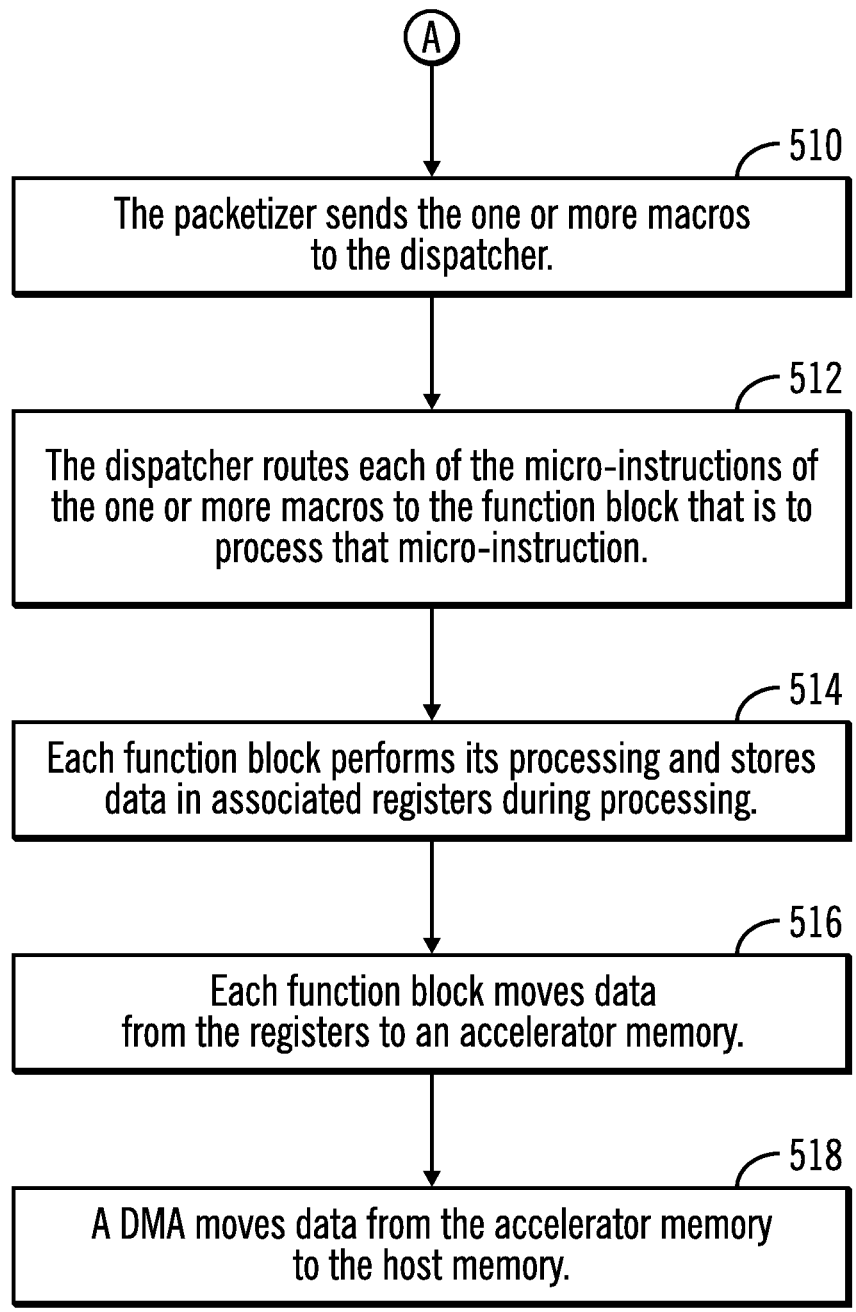

FIGS. 5A and 5B illustrates, in a flowchart, operations performed by an engine to process an operation code in accordance with certain embodiments. Control begins at block 500 with code storing macros in a lookup memory 322 of a packetizer 320 of an engine 300 of a hardware accelerator 120. In block 502, the hardware accelerator 120 receives a stream of operation codes from the host memory 114. In block 504, the hardware accelerator 120 stores the operation codes of the stream in an instruction queue 310. The operation codes are processed in order of position in the stream.

In block 506, a packetizer 320 retrieves an operation code of the operation codes from the instruction queue 310. In block 508, the packetizer 320 maps the operation code to one or more macros 324 in the lookup memory 322, where each of the macros is made up of micro-instructions. From block 508 (FIG. 5A), processing continues to block 510 (FIG. 5B).

In block 510, the packetizer 320 sends the one or more macros 324 to the dispatcher 330. In block 512, the dispatcher 330 routes each of the micro-instructions of the one or more macros 324 to the function block 362, 366, 370 that is to process that micro-instruction. In block 514, each function block 362, 366, 370 performs its processing and stores data in associated registers 360, 364, 368 during processing. In block 516, each function block moves data from the registers 360, 364, 368 to the accelerator memory 380. In block 518, the DMA moves data from the accelerator memory 380 to the host memory 114.

Figure 6:
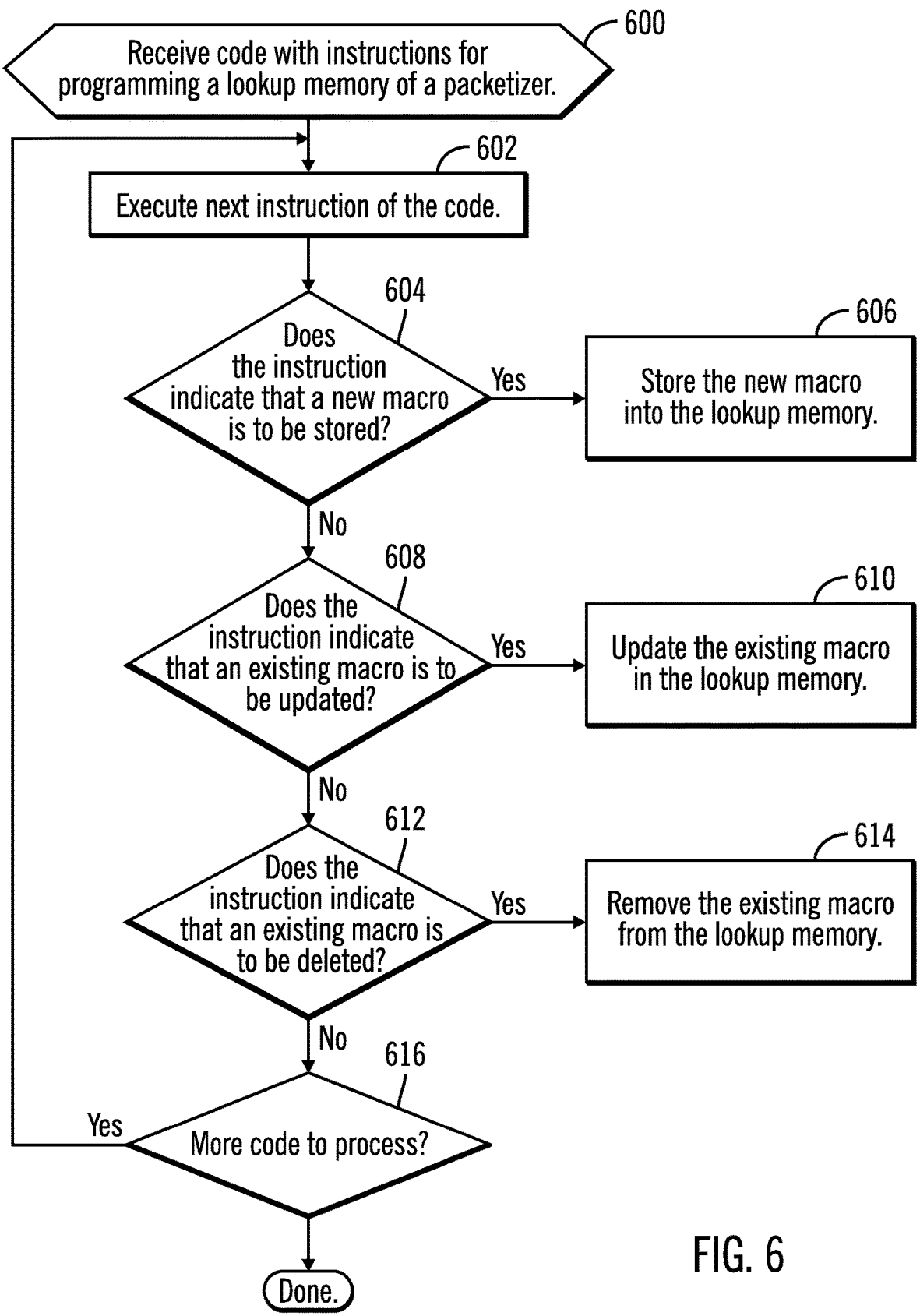
FIG. 6 illustrates, in a flowchart, operations performed by an engine to modify macros in a lookup memory in accordance with certain embodiments.

FIG. 6 illustrates, in a flowchart, operations performed by an engine to modify macros in a lookup memory in accordance with certain embodiments. Control begins at block 600 with the hardware accelerator 120 receiving code with instructions for programming the lookup memory 322 of the packetizer 320. In block 602, the hardware accelerator 120 executes a next instruction of the code (starting with a first instruction).

In block 604, the hardware accelerator 120 determines whether the instruction indicates that a new macro is to be stored. If so, processing continues to block 606, otherwise, processing continues to block 608. In block 606, the packetizer 320 stores the new macro into the lookup memory 322.

In block 608, the hardware accelerator 120 determines whether the instruction indicates that an existing macro is to be updated. If so, processing continues to block 610, otherwise, processing continues to block 612. In block 610, the packetizer 320 updates the existing macro in the lookup memory 322 (e.g., by overwriting the existing macro or by removing the existing macro and storing the updated macro).

In block 612, the hardware accelerator 120 determines whether the instruction indicates that an existing macro is to be removed. If so, processing continues to block 614, otherwise, processing continues to block 616. In block 614, the packetizer 320 removes the existing macro from the lookup memory 322.

In block 616, the hardware accelerator 120 determines whether there is more code to process. If so, processing loops to block 602 to select the next instruction, otherwise, processing is done.

With embodiments, the hardware accelerator 120 receives and stores the macros locally in the packetizer 320 of the engine 300. The packetizer 320 processes the algorithm to provide hardware acceleration of software functions. Embodiments may store a library of locally saved algorithms and macros. These may be referred to as "on-the-shelf-locally".

The hardware-side logic may be signaled by software application transactions to use the locally stored algorithms. In particular, the software application transactions may issue operation codes to an engine of the hardware accelerator 120, and the engine maps the operation code to a locally stored algorithm. These locally stored macros may be stored, re-used, and delivered across multiple engines.

Embodiments advantageously result in efficiency by avoiding movement of the instruction sets across the Processor-to-Hardware Accelerator FPGA. In particular, this provides a performance advantage over conventional systems.

With embodiments, the macros may also be reduced to much smaller macros. Then, these smaller macros may be multiplexed into the full-traffic operation, thus providing a dynamically-changing/high-performance hardware accelerator 120 engine.

Embodiments provide a dynamically changing algorithm and instantaneous-fetching of off-the-shelf locally stored algorithms and macros. Code may deliver to the hardware accelerator 120 a constantly-changing/tweaked/dynamically-changing/performance-enhancing algorithm in real-time with better performance than existing systems. The code may be a software application written to execute on the hardware accelerator 120 and that includes a Software Development Kit (SDK) that includes the runtime, the driver, etc.

The macros allow storing a library of functions in the lookup memory. In certain embodiments, hardware acceleration is performed by converting a plurality of software functions to machine readable code (macros) and storing the plurality of machine readable software functions (macros) in RAM (a lookup memory) of a plurality of distributed computing systems (engines). Then, one of the distributed computing systems receives a list of calls (operation codes) to execute one or more of the plurality of machine readable software functions (macros) and executes the called plurality of machine readable software functions (macros).

With embodiments, the macros are available on the hardware accelerator and the heterogenous processing is established a priori to any query such that the query already has these macros available when needed.

With embodiments, a single hardware accelerator has multiple macros that are intrinsically selected during software execution.

Embodiments convert a 32-bit instruction into a much larger set of micro-instructions that dynamically implement a macro.

Figure 7:
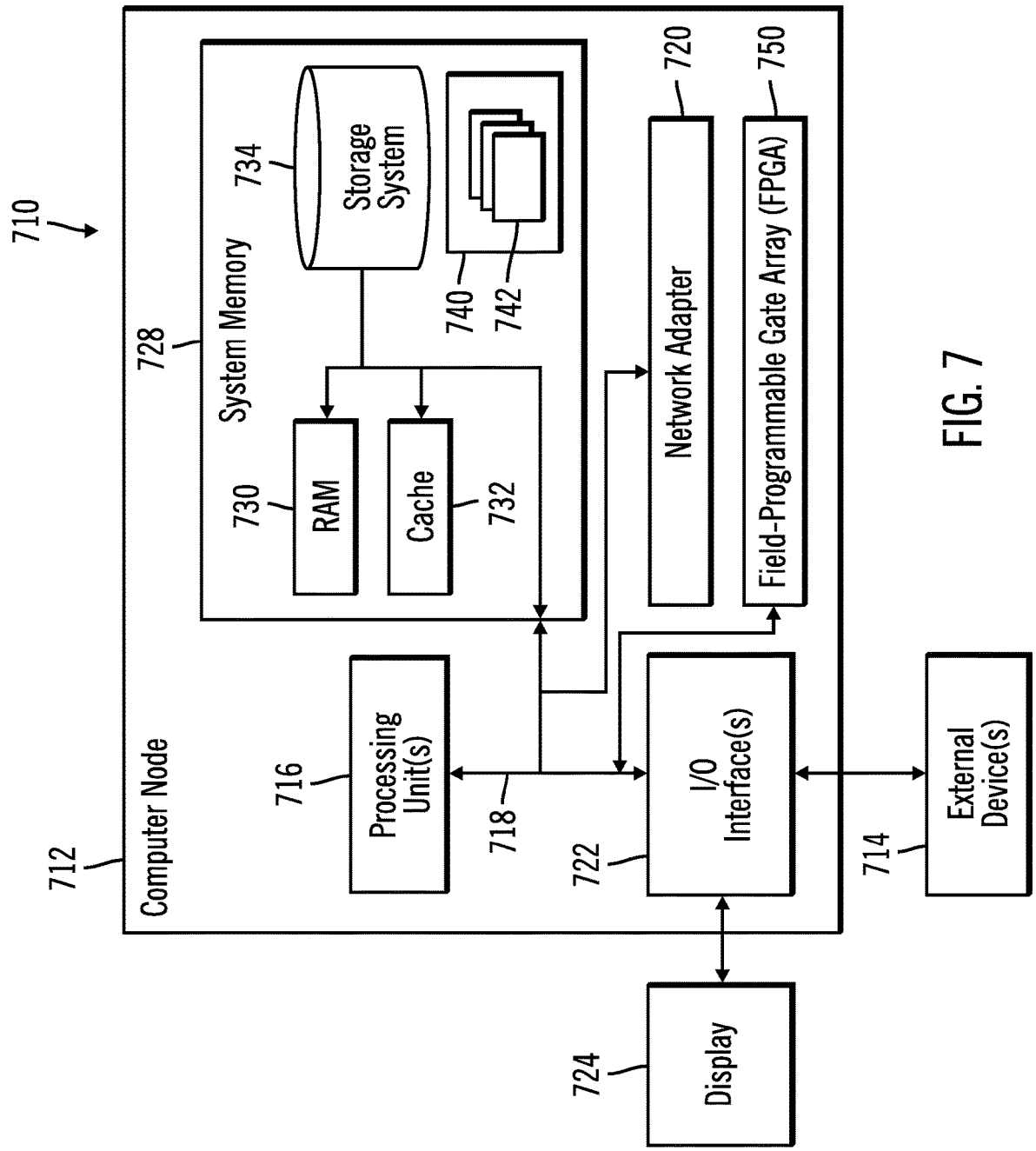
FIG. 7 illustrates a computing node in accordance with certain embodiments.

FIG. 7 illustrates a computing environment 710 in accordance with certain embodiments. Referring to FIG. 7, computer node 712 is only one example of a suitable computing node and is not intended to suggest any limitation as to the scope of use or functionality of embodiments of the invention described herein. Regardless, computer node 712 is capable of being implemented and/or performing any of the functionality set forth hereinabove.

The computer node 712 may be a computer system, which is operational with numerous other general purpose or special purpose computing system environments or configurations. Examples of well-known computing systems, environments, and/or configurations that may be suitable for use with computer node 712 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer node 712 may be described in the general context of computer system executable instructions, such as program modules, being executed by a computer system. Generally, program modules may include routines, programs, objects, components, logic, data structures, and so on that perform particular tasks or implement particular abstract data types. Computer node 712 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer node 712 is shown in the form of a general-purpose computing device. The components of computer node 712 may include, but are not limited to, one or more processors or processing units 716, a system memory 728, a bus 718 that couples various system components including system memory 728 to one or more processors or processing units 716 and an FPGA 750.

Bus 718 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer node 712 typically includes a variety of computer system readable media. Such media may be any available media that is accessible by computer node 712, and it includes both volatile and non-volatile media, removable and non-removable media.

System memory 728 can include computer system readable media in the form of volatile memory, such as random access memory (RAM) 730 and/or cache memory 732. Computer node 712 may further include other removable/non-removable, volatile/non-volatile computer system storage media. By way of example only, storage system 734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 718 by one or more data media interfaces. As will be further depicted and described below, system memory 728 may include at least one program product having a set (e.g., at least one) of program modules that are configured to carry out the functions of embodiments of the invention.

Program/utility 740, having a set (at least one) of program modules 742, may be stored in system memory 728 by way of example, and not limitation, as well as an operating system, one or more application programs, other program modules, and program data. Each of the operating system, one or more application programs, other program modules, and program data or some combination thereof, may include an implementation of a networking environment. Program modules 742 generally carry out the functions and/or methodologies of embodiments of the invention as described herein.

Computer node 712 may also communicate with one or more external devices 714 such as a keyboard, a pointing device, a display 724, etc.; one or more devices that enable a user to interact with computer node 712; and/or any devices (e.g., network card, modem, etc.) that enable computer node 712 to communicate with one or more other computing devices. Such communication can occur via Input/Output (I/O) interfaces 722. Still yet, computer node 712 can communicate with one or more networks such as a local area network (LAN), a general wide area network (WAN), and/or a public network (e.g., the Internet) via network adapter 720. As depicted, network adapter 720 communicates with the other components of computer node 712 via bus 718. It should be understood that although not shown, other hardware and/or software components could be used in conjunction with computer node 712. Examples, include, but are not limited to: microcode, device drivers, redundant processing units, external disk drive arrays, RAID systems, tape drives, and data archival storage systems, etc.

In certain embodiments, the computing device 100 has the architecture of computer node 712.

Additional Embodiment Details

The present invention may be a computer system, a method, an apparatus, hardware logic, and/or a hardware accelerator.

A computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of computer systems, methods, apparatus, hardware logic, and/or hardware accelerators according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of s computer systems, methods, apparatus, hardware logic, and/or hardware accelerators according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The foregoing description provides examples of embodiments of the invention, and variations and substitutions may be made in other embodiments.

What is claimed is:

1. A method implemented in a computer, wherein the computer comprises a host memory and a hardware accelerator, comprising:
   storing a plurality of macros in a lookup memory of each engine of a plurality of engines of the hardware accelerator of the computer, wherein the plurality of engines are coupled to an interface that arbitrates access of the plurality of engines to the host memory;
   storing an instruction in the host memory of the computer, wherein the instruction comprises a new operation code and operands;
   for the new operation code, adding at least one other macro to the plurality of macros stored in the lookup memory of an engine of the plurality of engines; and
   under control of the engine of the plurality of engines of the hardware accelerator:
      storing, with an instruction queue of the engine, the new operation code of the instruction;
      receiving, with a packetizer of the engine, the new operation code of the instruction from the instruction queue;
      mapping, with the packetizer of the engine, the new operation code to one or more macros of the plurality of macros in the lookup memory, wherein each of the one or more macros includes micro-instructions;
      sending, with the packetizer of the engine, the one or more macros to a dispatcher of the engine;
      routing, with the dispatcher of the engine, each of the micro-instructions of the one or more macros to a function block of a plurality of function blocks;
      processing each of the micro-instructions with the plurality of function blocks to generate data and store the data in registers;
      storing, with the plurality of function blocks, data from the processing of each of the micro-instructions from the registers to an accelerator memory of the hardware accelerator; and
      moving, with Direct Memory Access (DMA) the data from the accelerator memory to the host memory.

2. The method implemented in the computer of claim 1, further comprising:
   executing code in the hardware accelerator to modify the plurality of macros by at least one of storing a new macro, updating an existing macro, and removing an existing macro.

3. The method implemented in the computer of claim 1, wherein the plurality of function blocks comprise a map registers function block, a vector string register file function block, and a general purpose registers function block.

4. The method implemented in the computer of claim 1, wherein the micro-instructions are processed in parallel by the plurality of function blocks.

5. A computer system, comprising:
   a processor coupled to a bus;
   a host memory coupled to the bus, wherein the host memory stores an instruction, wherein the instruction comprises a new operation code and operands; and
   a hardware accelerator coupled to the bus, wherein the hardware accelerator comprises a plurality of engines coupled to an interface that arbitrates access of the plurality of engines to the host memory, and wherein an engine of the plurality of engines comprises:
      an instruction queue that receives and stores the new operation code of the instruction;
      a packetizer that is coupled to the instruction queue and that stores a plurality of macros in a lookup memory, wherein the packetizer adds at least one other macro to the plurality of macros for the new operation code, wherein the packetizer retrieves the new operation code from the instruction queue, wherein the packetizer maps the new operation code to one or more macros of the plurality of macros in the lookup memory, and wherein each of the one or more macros includes micro-instructions;
      a dispatcher that is coupled to the packetizer and to a plurality of function blocks and that receives the one or more macros from the packetizer, routes each of the micro-instructions of the one or more macros to a function block of the plurality of function blocks that is to process that micro-instruction, wherein the plurality of function blocks generate data and store the data in registers;

an accelerator memory that is coupled to the plurality of function blocks and that receives the data from the plurality of function blocks and stores the data from processing of each of the micro-instructions by the plurality of function blocks; and a direct memory access that is coupled to the accelerator memory and that moves the data from the accelerator memory to the host memory.

6. The computer system of claim 5, wherein the hardware accelerator executes code to modify the plurality of macros by at least one of storing a new macro, updating an existing macro, and removing an existing macro.

7. The computer system of claim 5, wherein the plurality of function blocks comprise a map registers function block, a vector string register file function block, and a general purpose registers function block.

8. The computer system of claim 5, wherein the micro-instructions are processed in parallel by the plurality of function blocks.

9. A hardware accelerator in a computer system, wherein the computer system includes a processor and a host memory, comprising:

a plurality of engines, wherein the plurality of engines are coupled to an interface that arbitrates access of the plurality of engines to the host memory, wherein each engine includes:

an instruction queue;

a packetizer coupled to the instruction queue;

a dispatcher coupled to the packetizer;

an accelerator memory;

a plurality of function blocks coupled to the dispatcher and to the accelerator memory;

a direct memory access coupled to the accelerator memory; and control logic to perform operations, the operations comprising:

storing, with the host memory, an instruction, wherein the instruction comprises a new operation code and operands;

storing, with the instruction queue, the new operation code of the instruction;

storing, with the packetizer, a plurality of macros in a lookup memory, wherein the plurality of macros include at least one other macro added for the new operation code;

retrieving, with the packetizer, the new operation code from the instruction queue;

mapping, with the packetizer, the new operation code to one or more macros of the plurality of macros in the lookup memory, wherein each of the one or more macros includes micro-instructions;

sending, with the packetizer, the one or more macros to the dispatcher;

routing, with the dispatcher, each of the micro-instructions of the one or more macros to a function block of the plurality of function blocks that is to process that micro-instruction;

processing, with the plurality of function blocks, each of the micro-instructions to generate and store data in registers and move the data from the registers to the accelerator memory; and moving, with the direct memory access, the data from the accelerator memory to the host memory.

10. The hardware accelerator of claim 9, wherein the control logic performs operations, the operations comprising:

executing code to modify the plurality of macros by at least one of storing a new macro, updating an existing macro, and removing an existing macro.

11. The hardware accelerator of claim 9, wherein the plurality of function blocks comprise a map registers function block, a vector string register file function block, and a general purpose registers function block.

12. The hardware accelerator of claim 9, wherein the micro-instructions are processed in parallel by the plurality of function blocks.

* * * * *